(12) United States Patent
Li (10) Patent No.: US 12,462,484 B2
(45) Date of Patent: Nov. 4, 2025

(54) METHOD FOR GENERATING A HEXAHEDRAL MESH

(71) Applicant: TESSAEL, Villers les Nancy (FR)

(72) Inventor: Wan-Chiu Li, Nancy (FR)

(73) Assignee: TESSAEL, Villers les Nancy (FR)

( * ) Notice: Subject to any disclaimer, the term of this patent is extended or adjusted under 35 U.S.C. 154(b) by 169 days.

(21) Appl. No.: 18/553,384

(22) PCT Filed: Mar. 30, 2022

(86) PCT No.: PCT/FR2022/050598
§ 371 (c)(1),
(2) Date: Sep. 29, 2023

(87) PCT Pub. No.: WO2022/208024
PCT Pub. Date: Oct. 6, 2022

(65) Prior Publication Data
US 2024/0185522 A1    Jun. 6, 2024

(30) Foreign Application Priority Data

Apr. 2, 2021   (FR) ...................................... 2103450

(51) Int. Cl.
*G06T 17/05* (2011.01)
*G06T 17/20* (2006.01)
(52) U.S. Cl.
CPC .............. *G06T 17/05* (2013.01); *G06T 17/20* (2013.01)
(58) Field of Classification Search
CPC .................................. G06T 17/05; G06T 17/20
(Continued)

(56) References Cited

U.S. PATENT DOCUMENTS 5,740,342 A    4/1998   Kocberber
5,768,156 A *  6/1998   Tautges .................. G06T 17/20
                                                         703/2

(Continued)

FOREIGN PATENT DOCUMENTS

EP    2869096 A1    5/2015
EP    3185048 A1    6/2017

OTHER PUBLICATIONS

International Search Report issued on Jun. 20, 2022, in corresponding PCT Patent Application No. PCT/FR2022/050598, 5 pages.

(Continued)

*Primary Examiner* — David T Welch
(74) *Attorney, Agent, or Firm* — Maier & Maier, PLLC (57) ABSTRACT

A method is described for generating a hexahedral mesh from a geological model, including: generating a three-dimensional tetrahedral mesh from the geological model; getting a 3D hexahedral mesh based on a tetrahedral mesh, including: verticalizing the tetrahedral mesh to make the faults and boundaries of the domain vertical; calculating a global 2D parameterization for a reference horizon of the verticalized mesh; determining a 2D grid formed from quadrilaterals representing the reference horizon based on the global parameterization; getting a 3D hexahedral mesh by propagation of the grid to the other horizons of the model; and restoring the initial geometry of the faults; and implementing an additional processing of the mesh in order to structure the mesh near each singular point.

12 Claims, 7 Drawing Sheets

(58) Field of Classification Search
USPC .......................................................... 345/419
See application file for complete search history.

(56) References Cited

U.S. PATENT DOCUMENTS

| | | | | |
|---|---|---|---|---|
| 6,362,820 | B1* | 3/2002 | Hoppe | G06T 17/20 |
| | | | | 345/419 |
| 6,625,938 | B1* | 9/2003 | Shimada | G06T 17/20 |
| | | | | 52/81.3 |
| 8,150,663 | B2 | 4/2012 | Mallet | |
| 10,114,134 | B2 | 10/2018 | Li et al. | |
| 2002/0144231 | A1* | 10/2002 | Hariya | G06T 17/20 |
| | | | | 716/55 |
| 2011/0015910 | A1* | 1/2011 | Ran | G06T 17/20 |
| | | | | 703/2 |
| 2011/0106507 | A1* | 5/2011 | Lepage | G01V 11/00 |
| | | | | 703/2 |
| 2012/0026167 | A1* | 2/2012 | Ran | G09B 23/40 |
| | | | | 345/420 |
| 2013/0231903 | A1* | 9/2013 | Li | G01V 1/325 |
| | | | | 703/2 |
| 2014/0278298 | A1* | 9/2014 | Maerten | G01V 20/00 |
| | | | | 703/2 |
| 2015/0120262 | A1* | 4/2015 | Dulac | G01V 20/00 |
| | | | | 703/6 |
| 2015/0212231 | A1* | 7/2015 | Borouchaki | G01V 11/00 |
| | | | | 703/10 |
| 2017/0184760 | A1 | 6/2017 | Li et al. | |
| 2018/0031720 | A1* | 2/2018 | Etiene Queiroz | G06T 15/08 |
| 2018/0322232 | A1* | 11/2018 | Klinger | G01V 20/00 |
| 2019/0096127 | A1* | 3/2019 | Huang | G06T 17/205 |
| 2019/0228577 | A1* | 7/2019 | Gregory | G06T 17/20 |
| 2020/0151286 | A1* | 5/2020 | Willis | G06T 17/20 |
| 2022/0335691 | A1* | 10/2022 | Tian | G06T 19/20 |
| 2022/0392160 | A1* | 12/2022 | Hasselgren | G06T 17/20 |
| 2022/0392162 | A1* | 12/2022 | Shen | G06T 17/20 |
| 2023/0140460 | A1* | 5/2023 | Munkberg | G06N 3/045 |
| | | | | 345/423 |
| 2023/0215094 | A1* | 7/2023 | Singh | G06T 17/10 |
| | | | | 345/419 |
| 2023/0394764 | A1* | 12/2023 | Ladavac | G06T 7/13 |
| 2023/0394767 | A1* | 12/2023 | Ladavac | G06T 17/205 |
| 2024/0233294 | A1* | 7/2024 | Wang | G06T 17/20 |

OTHER PUBLICATIONS

Ray et al., "PeriodicGlobalParameterization", ACM Transactions on Graphics, Oct. 11, 2006, 10.1145/1183287.1183297, 30 pages.

Sokolov et al., "Hexahedral Dominant Meshing", ACM Transactions on Graphics, vol. 28, No. 4, Article 106, Aug. 2009, 23 pages.

Palagi et al., "Use of Voronoi Grid in Reservoir Simulation", SPE Advanced Technology Series 2 (02): 69-77. SPE-22889-PA, 1994, 9 pages.

Ray et al., "Periodic Global Parameterization", ACM Transactions on Graphics, Association for Computing Machinery, Oct. 2006, 26 pages.

Bommes et al., "Mixed-Integer Quadrangulation", ACM Transactions on Graphics, vol. 28, No. 3, Article 77, Aug. 2009, 10 pages.

* cited by examiner

METHOD FOR GENERATING A HEXAHEDRAL MESH

FIELD

The present disclosure relates to a method for generating a structured hexahedral mesh from a geological model. If finds preferred applications for the study of the migration of fluids, geomechanics, unfolding of geological units and also the diffusion of heat from a geological domain, e.g. a geological hydrocarbon reservoir, geothermal resources or $CO_2$ storage.

BACKGROUND

In order to implement numeric simulations, like fluid flow simulations, in a reservoir represented by a geological model, it is known to use a mesh of this geological model which may then be populated with petrochemical, petrophysical and mechanical parameters with which to execute numeric simulations.

In order to make implementation of these simulations easier, representing the geological model by a structured hexahedral mesh is preferable; meaning, a mesh in which each cell has the shape of a hexahedron, and for which each cell (except the cells located at the limits of the model) has a constant number of neighboring cells, or stated another way in which each vertex of a cell belongs to a constant number of cells, typically 8. In this way, each cell of a structured mesh may be simply indexed by a three-dimensional table (U, V, W).

Figure 1A:
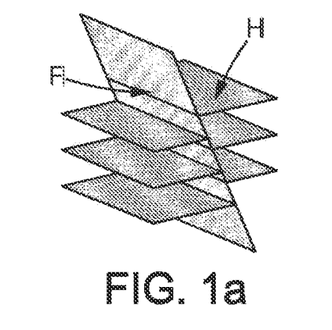
FIG. 1a, already described, shows a sample geological model.
Figure 1B:
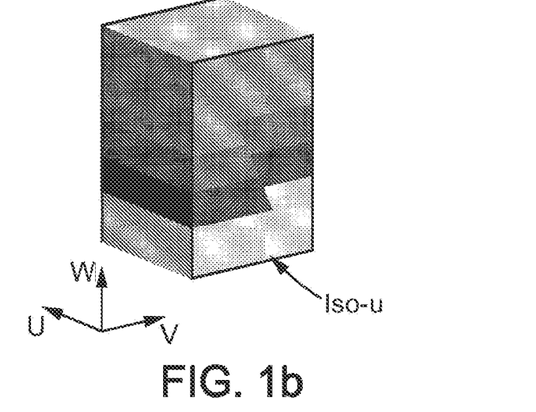
FIG. 1b, already described, shows constant u surfaces of a parameterization of the geological model.
Figure 1C:
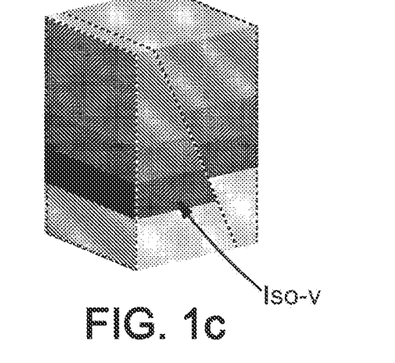
FIG. 1c, already described, shows constant v surfaces of a parameterization of the geological model.
Figure 1D:
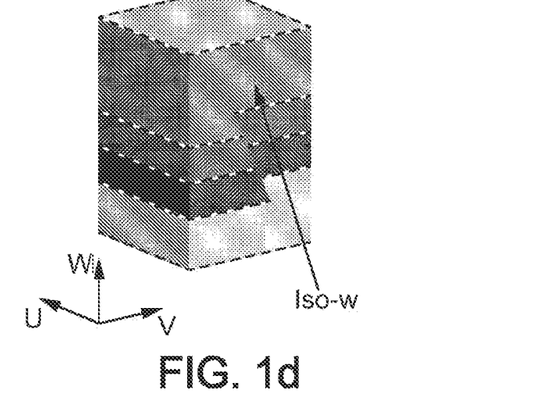
FIG. 1d, already described, shows constant w surfaces of a parameterization of the geological model.
Figure 1E:
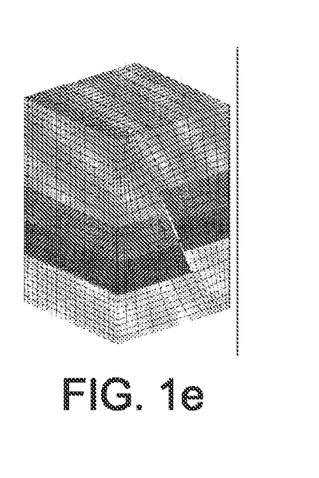
FIG. 1e, already described, shows a structured hexahedral mesh obtained for a simple geological model in which a fault can be approximated as being parallel to a boundary of the model.

Referring to FIG. 1a, a simple example of a geological model to be represented is shown; the model comprises horizons H and faults F. For this type of model, implementing a structured hexahedral mesh is known where the faults and the boundaries of the study domain are approximated as extending solely along one of the two orthogonal directions U and V, as shown in FIGS. 1b and 1c. In FIG. 1d, a third direction, W, orthogonal to the first two directions, is defined by a stacking of the horizons, such that each horizon extends along a surface of equal W. The resulting mesh is shown in FIG. 1e.

Figure 2:
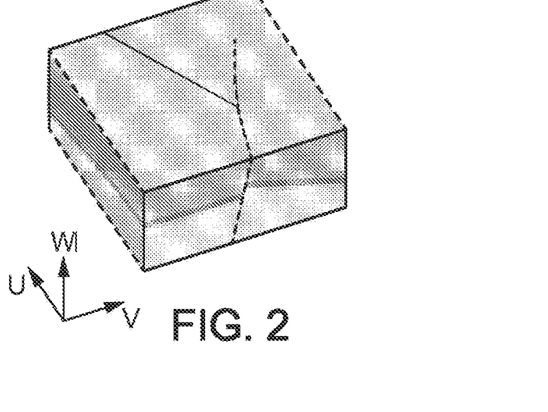
FIG. 2, also already described, shows the impossibility of applying the same type of mesh in the case of faults having an intersection.

This mesh, however, is not applicable to more complex cases, in particular when there are intersections between faults, or between faults and boundaries of the model, or again in case of dying faults, meaning a fault which ends before reaching a boundary of the domain. Such an example is shown in FIG. 2: the faults shown in dotted lines may be approximated by one fault extending along the direction U, but the other fault may not then either be approximated by a parallel fault (because by definition it is crosscutting with the first fault), or by a fault extending along the direction V because it is also crosscutting with the boundary of the domain extending along the direction V.

In order to implement a precise representation of this type of geological model, several approaches have been proposed. Approaches, like for example in the document U.S. Pat. No. 8,150,663, are known which aim to approximate a fault by a "stairstep" representation combining surfaces extending along U and along V. This way a structured mesh results which is compatible with most flow simulation software currently on the market. However, this type of representation is not appropriate for implementing mechanical simulation calculations which require high fidelity in the representation of the faults in order to apply limit constraints. Thus when one wants to perform both flow calculations and mechanical calculations (meaning coupled calculations), it is necessary to implement two meshes, one as indicated above for the flow calculations and another, more faithful for the representation of faults, which may for example be tetrahedral (and therefore unstructured) for the mechanical calculations. This consumes twice the amount of computer memory. The coupling requires a round-trip transfer of petrophysical and mechanical properties between the two meshes, which is error-prone and a waste of time.

Other approaches use a mixed mesh which is mostly hexahedral in the zones of the geometric model without faults, and which is locally non-hexahedral near faults, by filling the zones of the mesh adjacent to the faults with polyhedra like in U.S. Ser. No. 10/114,134 or with other non-hexahedral elements such as tetrahedra or prisms, in US 2017/0184760.

The disadvantage of this type of approach is that it is not compatible with some slow simulators available on the market which only operate or are only optimal with structured hexahedral meshes. The same problem also comes up for integrally unstructured meshes, like for example Voronoi meshes, described in Palagi C. L. and Aziz, K.: "Use of Voronoi Grid in Reservoir Simulation," SPE Advanced Technology Series 2 (02): 69-77.SPE-22889-PA

SUMMARY

The present disclosure aims to improve the situation.

In particular, the goal of the disclosure is to propose a method with which to implement a structured hexahedral mesh based on geological models for which current solutions only provide locally unstructured or integrally unstructured meshes.

The goal of the disclosure is to implement a structured hexahedral mesh based on geological models comprising dying faults, or substantially vertical intersections between two faults or between a fault and a boundary of the domain.

Another goal of the disclosure is to allow implementation of a mostly structured hexahedral mesh from a geometric model which may also comprise substantially horizontal intersections between two faults or between a fault and a boundary of the domain.

In this respect, a method is proposed for generation of a hexahedral mesh based on a geological model delimited by a set of boundaries and comprising a set of horizons and a set of faults, where the method is implemented by a computer and comprises:

generating a three-dimensional tetrahedral mesh based on the geological model, where the tetrahedral mesh satisfies a set of surface constraints corresponding to the faults, horizons and boundaries of the model;

getting a three-dimensional hexahedral mesh based on a tetrahedral mesh, comprising:

applying a first deformation to the tetrahedral mesh to make the faults and boundaries vertical;

calculating a global parameterization in two dimensions (U, V) for a reference horizon of the deformed tetrahedral mesh;

determining a two-dimensional grid formed from quadrilaterals representing the reference horizon based on the global parameterization along two axes (U, V) of said reference horizon;

getting a three-dimensional hexahedral mesh by propagation of the grid representing the reference horizon to the other horizons of the geological model; and applying a deformation that is an inverse to the first deformation to the resulting hexahedral mesh in order to restore the initial geometry of the faults; and if the resulting hexahedral mesh comprises at least one singular point, implementing an additional processing of the mesh in order to structure the mesh near each singular point.

In some embodiments, the propagation of the grid to three dimensions comprises:
  calculating a parameterization in W of the three-dimensional tetrahedral mesh such that each horizon corresponds to a constant-value surface along the coordinate w; and
  determining a two-dimensional grid based on quadrilaterals representing each constant surface along the coordinate W starting from the grid representing the reference horizon; and
  constructing a set of consecutive hexahedra between two constant surfaces along the W coordinate, such that two opposite surfaces of the hexahedron are formed respectively by a quadrilateral of each constant surface, where said set of hexahedra form the hexahedral mesh.

In some embodiments, the determination of a two-dimensional grid based on quadrilaterals representing a constant surface along the W coordinate is done by a vertical projection, on said constant-value surface, of the grid representing the reference horizon.

In some embodiments, the calculation of the global parameterization in (U, V) of the reference horizon is implemented such that the edges of the reference horizon coincide with integer constant-value lines of U and V, and the determination of the two-dimensional grid formed of quadrilaterals representing the reference horizon is implemented by forming a set of quadrilaterals whose vertexes are defined by points of intersection of the integer constant-value lines of U and V.

In some embodiments, the calculation of a global parameterization along two axes (U, V) of a reference horizon is implemented such that each cell of the reference horizon is parameterized relative to two axes U and V, where the directions of the axes U and V of the reference frame are variable along the reference horizon.

In some embodiments, the global parameterization (U, V) of the reference horizon associates with each shared edge between two neighboring triangles a transition function establishing a relation between the coordinates (Uj, Vj) of the edge of the first triangle and the coordinates (Uk, Vk) of the edge of the other triangle such that: (Uj, Vj)=$R^a$(Uk, Vk)+(b,c), where $R^a$=is the rotation of the reference frame by a multiple of 90°, (b,c) is the translation of the coordinates, and a, b, c are all integer values.

In some embodiments, the generation of a tetrahedral mesh from a geological model is implemented by constrained Delaunay tessellation.

In some embodiments, the additional processing of the mesh for making the structured mesh comprises:
  Partitioning of the hexahedral mesh obtained into a plurality of structured hexahedral submeshes each associated with a respective local indexing (U, V, W);
  integrating each structured hexahedral submesh into a structured hexahedral mesh associated with a global indexing (U, V, W); and
  identifying all of the neighboring mesh-cell pairs in the hexahedral mesh initially obtained and which are no longer in the structured hexahedral mesh with global indexing.

In some embodiments, the partitioning of the hexahedral mesh is implemented by:
  partitioning of the two-dimensional grid based on quadrilaterals representing the reference horizon as subgrids, by cut-lines starting from a singular point and extending along an edge of a quadrilateral of the grid for which the singular point is a vertex; and
  propagating along the W axis for each cutline in order to get a cut plane for the hexahedral mesh.

In some embodiments, the method may also comprise implementation, on the resulting mesh, of additional processing from the following group:
  Modeling of physical properties by geostatistical methods;
  Fluid flow simulation;
  Geomechanical simulation;
  Heat simulation;
  Chemical simulation;
  Coupled multi-physical simulation;
  Kinematic simulation.

In some embodiments, the method is implemented for representation of a geological model further comprising at least one well, wherein the well is represented by a line of intersection between two surfaces treated as virtual faults.

In some embodiments, the integration of each structured hexahedral submesh into a structured hexahedral mesh associated with a global indexing (U, V, W) comprises:
  partitioning of a grid into two dimensions representing a horizon and a plurality of subgrids;
  integrating all of the subgrids into a two-dimensional grid associated with a global indexing (U, V), where said integration comprises:
    for each subgrid, determining a frame in two dimensions, U and V, encompassing all of the occupied indexes of the subgrid in its local indexing, and determining $U_{max\_i}$ and $V_{max\_i}$ dimensions of this frame;
    initializing a two-dimensional grid associated with a global indexing (U, V); the dimensions in U and V are respectively the sum of the dimensions in U and the sum of the dimensions in V of the frames determined for all the subgrids;
    filling in the global indexing grid by each subgrid in order of decreasing size of each subgrid, such that each subgrid inserted in the global indexing grid occupies only unoccupied indexes of the global indexing grid, and that it is the closest possible to the previously inserted subgrids;
    resizing the global indexing grid in order to correspond to a minimum frame encompassing all the subgrids; and
  propagating the resulting global indexing grid along the W axis in order to get a structured hexahedral mesh integrating all the submeshes including the initial hexahedral mesh.

According to another object, a method is described for generating a mostly hexahedral mesh from a geological model comprising at least two crosscutting faults having an intersection extending along a substantially horizontal line, and the method comprises:
  implementing the method according to the preceding description based on a modified geological model wherein a fault was eliminated from a set of crosscutting faults so as to eliminate the substantially horizontal intersection, in order to get a hexahedral mesh;
  eliminating a set of hexahedral mesh cells located at the intersection with the placement of the eliminated fault;
  integrating the eliminated fault in the hexahedral mesh and filling in the eliminated cells with polyhedral cells.

A computer program product is also described, comprising code instructions for implementing of one of the previously described methods, when it is executed by a computer.

A computer-readable nonvolatile medium is also described on which are stored the code instructions for implementing one of the methods according to the preceding description, when they are executed by a computer.

According to another subject, a device is also described for generating a hexahedral mesh based on a geological model characterized in that it comprises a computer configured for implementation of one of the methods according to the preceding description.

With the proposed method, a structured hexahedral mesh with a regular indexing can be obtained from a geological model including in the case where the model comprises dying faults or faults having a substantially vertical intersection.

In fact, the fact of making the faults vertical, and then implementing a global parameterization of a two-dimensional horizon of the domain which is propagated to other horizons, allows effectively and robustly implementing a global parameterizing of all of the three-dimensional domain, by producing a minimum of singular points, and respecting the geometry of the faults and horizons with fidelity. The fact of having the same parameterizing in two dimensions for each horizon also allows locally reprocessing each singular point in order to make the mesh structured near said point and in that way get an integrally structured mesh.

In the case of faults "in X" or "in Y", meaning two faults having a substantially horizontal intersection, this method may also be implemented by ignoring one of the faults from the intersection, and then by supplementing the mesh by polyhedral mesh cells, for example tetrahedral or hexahedral in the area of the previously ignored faults in order to get, for this type of more complex geometric model, a structured mostly hexahedral mesh.

BRIEF DESCRIPTION OF THE DRAWINGS

Other characteristics, details and advantages will appear upon reading the following detailed description, and the analysis of the attached drawings, on which:

FIG. 6b shows an example of application of a method for obtaining a mostly hexahedral mesh, according to an embodiment, for geological model comprising faults in X or in Y, having a substantially horizontal intersection.

DETAILED DESCRIPTION

Figure 7:
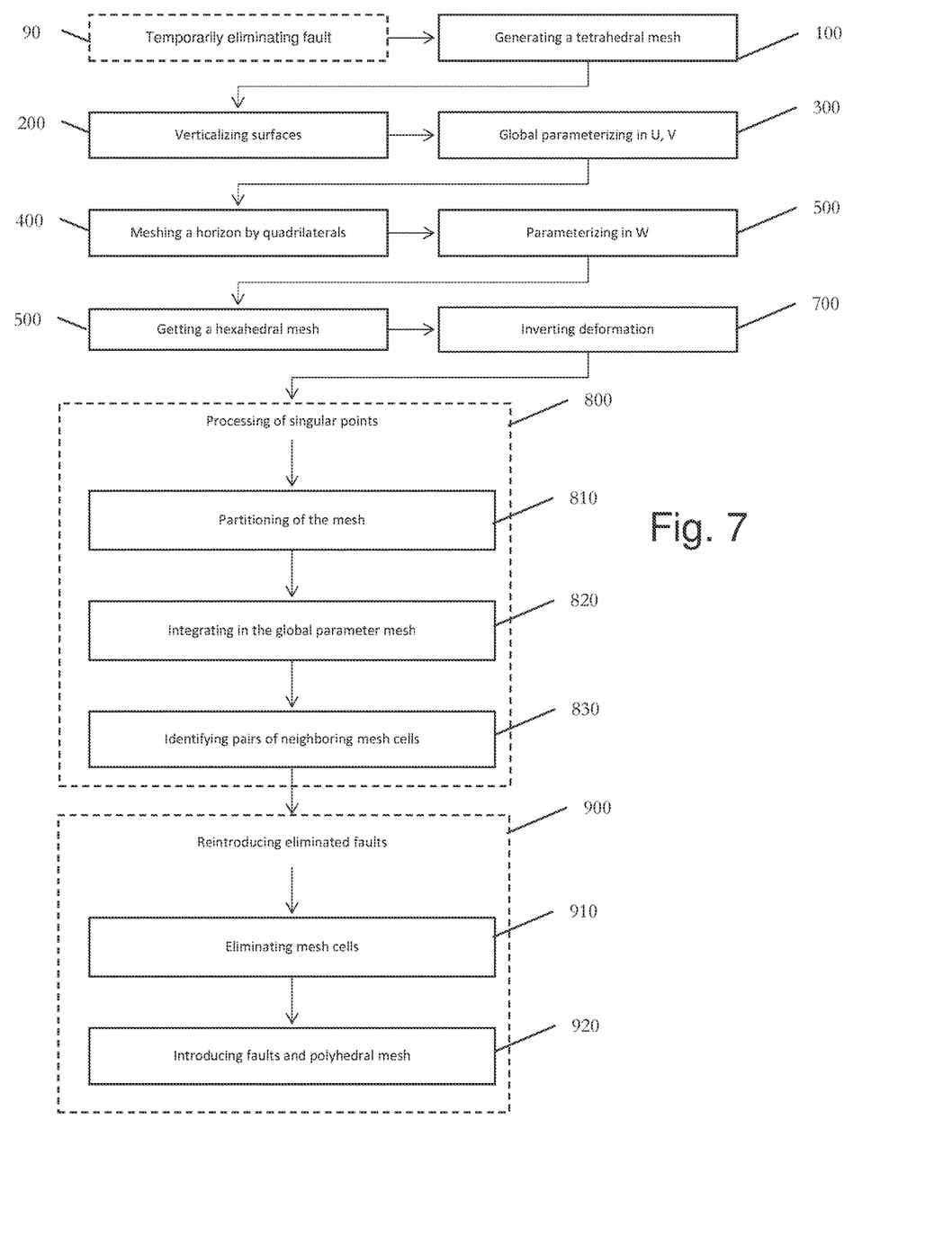
FIG. 7 schematically shows the main steps of the method according to an embodiment.

Referring to FIGS. 3a to 3e and to FIG. 7, we are now going to describe a method for generation of a hexahedral mesh from a geological model. This method is implemented by a computer, for example a central processor or a graphical processor, by execution a series of code instructions stored in memory.

The geological model comprises a set of horizons H or geological layers; during their formation, the horizons were substantially horizontal and superposed one on the others. Because of geological deformations which occurred between the formation of the horizons and the present, the horizons of the geological model are not necessarily horizontal. The geological model may also comprise faults F extending transversely to the horizons and which may also lead to a discontinuity in the height of a horizon from one side of the fault to the other.

Figure 8:
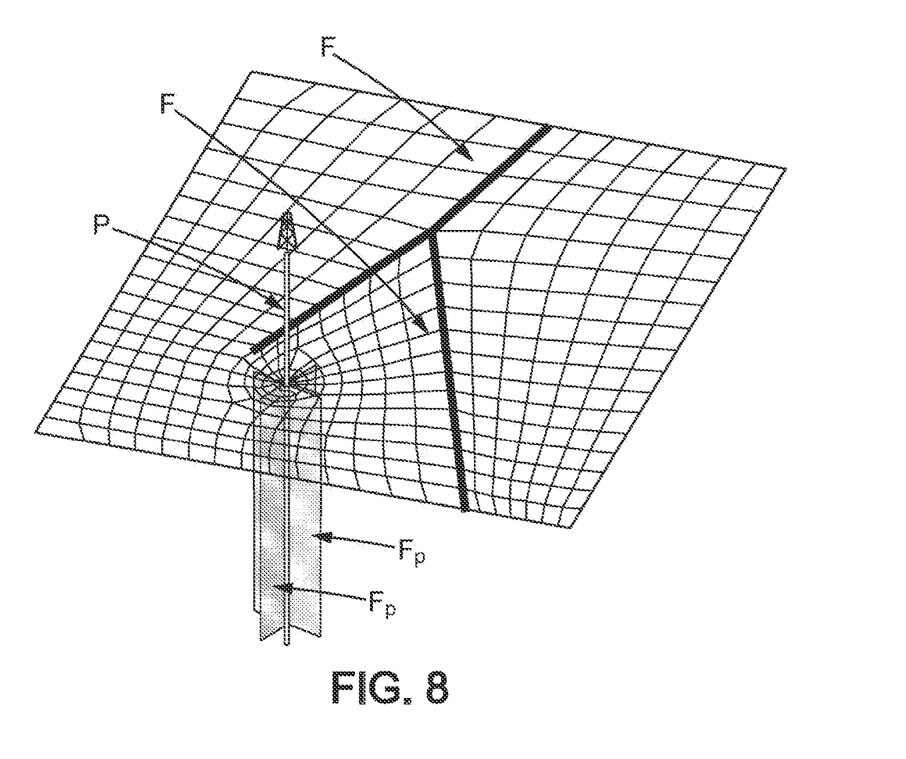
FIG. 8 shows a mesh of a geological model incorporating a well.

In some embodiments, the geological model may also comprise one or more wells P. Each well may be represented by one or more substantially straight segments, where each segment is defined as the intersection of two surfaces $F_p$ which are treated as virtual faults in the remainder of the method. A geometrically simple well is shown in FIG. 8; this well comprises a straight vertical segment defined by the intersection of two substantially vertical surfaces which are treated as faults. These virtual surfaces are only used for implementing constraints and are not shown in the final mesh. Only the intersection of the virtual surfaces approximating the path of the well is shown in the final mesh. Some more complex wells may also be shown, comprising for example a substantially vertical segment and one or several substantially horizontal segments.

In the following, the cases will be considered separately where:
- the geological model does not comprise any faults, or comprises non-intersecting faults or faults whose intersection extends substantially vertically, including virtual surfaces for the representation of wells or substantially vertical segments of wells; and
- the case where the geological model comprises faults whose intersection extends substantially horizontally, and which may also be designated by faults in X or faults in Y, and/or substantially horizontal wells or well segments, formed by the intersection of virtual surfaces in X or in Y.

Further, the geometric model is delimited by a set of boundaries (artificial boundaries which delimit the modeling zone).

Figure 5A:
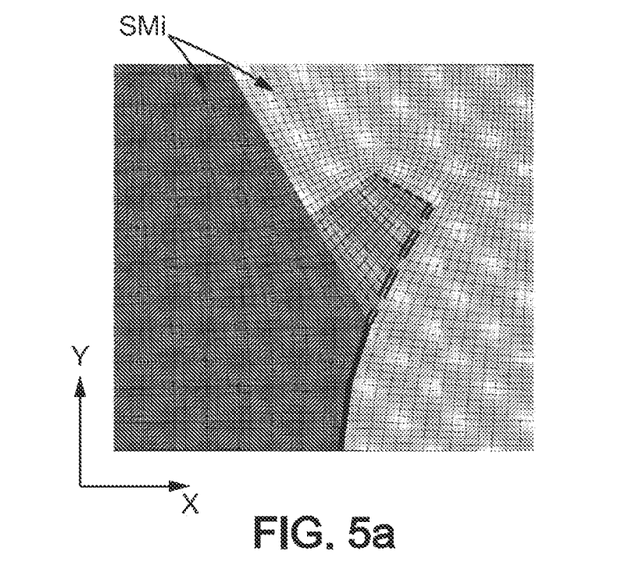
FIG. 5a shows an example of partitioning of the surface of a locally unstructured hexahedral mesh.

Referring to FIG. 7, in the case where the geometric model comprises, as in the example from FIG. 5a, crosscutting faults whose intersection extends along a substantially horizontal line, meaning faults in X or in Y, or substantially horizontal wells or well segments, the method for generating a hexahedral mesh from the geological model comprises a preliminary step 90 of temporary elimination of at least one fault from a set of crosscutting faults such that the two faults no longer have a horizontal intersection. This step allows returning to the first case described above, which does not comprise faults in X or in Y or horizontal wells, for the implementation of the remainder of the steps.

The following steps are therefore described with reference to a geological model which does not comprise faults in X or in Y or horizontal wells, either because the geological model initially corresponds to this case, or because they apply to a geological model modified following implementation of step 90.

Figure 3A:
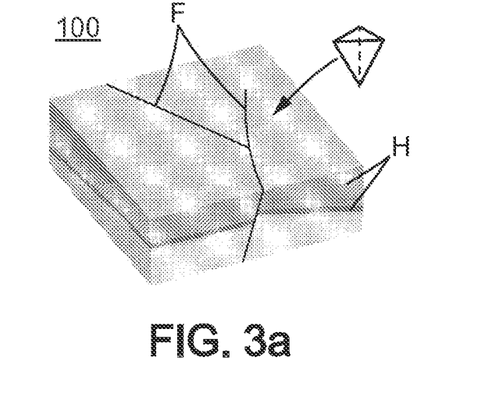
FIG. 3a schematically shows a step of obtaining a tetrahedral mesh from a geological model.

Referring to FIG. 3a, the method for generating a hexahedral mesh from the initial geological model or the geological model modified according to step 90 comprises a first step 100 of generating a three-dimensional tetrahedral mesh T from the geological model, where the tetrahedral mesh T respects the faults, horizons and boundaries of the domain covered by the geological model.

This step may be done conventionally by implementing a constrained Delaunay tessellation wherein the faults, horizons and boundaries of the domain are treated as surface constraints. A tessellation corresponds to a triangulation in three dimensions. At the end of this step, the faults, horizons and boundaries of the domain are shown in the form of triangulated two-dimensional surfaces.

The method next comprises steps with which to obtain, from the tetrahedral mesh, a first hexahedral mesh of the model. In a hexahedral mesh, each point of the mesh is connected to a constant number of eight neighboring cells (except at the edges). A singular point is a point which is connected to a different number of neighboring cells, which may be smaller or larger. The steps described below serve to get a hexahedral mesh which may, depending on the complexity of the geometric model represented, either be structured, meaning comprising no singular point, or comprise, by the nature of the steps implemented, a reduced number singular points.

Figure 3B:
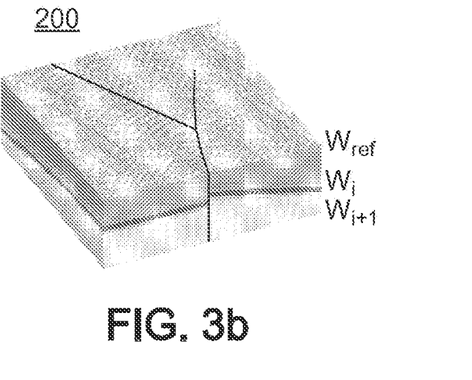
FIG. 3b schematically shows a step of making a tetrahedral mesh vertical.

Referring to FIG. 3b, a step 200 comprises the verticalization of the surfaces of the tetrahedral mesh formed by the faults and by the boundaries of the domain. To do this, for each triangulated surface representing a fault or boundary of the domain, a new position (Xv, Yv, Zv) is calculated for each vertex of a triangle of the surface, such that the surface is verticalized. The new position is calculated by implementing a constrained numerical optimization method, minimizing an energy defined as the distance between the initial geometry of the surface and the verticalized geometry of the surface, subject to the constraint that the verticalized geometry of the surface be effectively vertical, meaning that the Z component of the normal to all the triangles of the verticalized surface is zero. The distance between the initial geometry and the verticalized geometry may for example be calculated between the position of each point of the initial geometry and the position of the same point in the verticalized geometry.

In the case where the vertex of a triangle is shared by more than one surface, which is in particular the case of a vertex located near a fault, which in this case belongs to two surfaces laid out on either side of the fault, or for a vertex located near an intersection between a fault and the boundary of the domain, then the verticalized position of this vertex is determined as the calculated average value for the position of each surface to which this vertex belongs.

Verticalized geometries of the surfaces representing the faults and the boundaries of the domain are then used for calculating a deformation $\Omega(T)$ of all of the positions of the vertexes of the tetrahedral mesh T by interpolation. The deformation is calculated by implementing a constrained numerical optimization method, minimizing a distance between the initial geometry of the mesh T and the deformed (or verticalized) geometry $\Omega(T)$ thereof, by using the positions (Xv, Yv, Zv) of the vertexes of each verticalized surface as constraints. Here again, the distance between the initial geometry and the verticalized geometry may be calculated between the initial position of each vertex of the mesh and the position of the same vertex in the verticalized geometry.

The method next comprises calculating a global parameterization 300 in two dimensions (U, V) for a reference horizon of the verticalized tetrahedral mesh (T). The reference horizon is shown by $W_{ref}$ in FIG. 3b. In this figure, it involves the horizon corresponding to the upper surface of the model, but the choice of reference horizon is arbitrary.

The reference horizon $W_{ref}$ is therefore a triangulated two-dimensional surface, comprising a set of triangles which correspond to tetrahedral surfaces of the verticalized tetrahedral mesh $\Omega(T)$. The boundary of this surface $\delta W_{ref}$ comprise all of the vertexes and edges of the triangles of the surface at the intersection with faults, other horizons or boundaries of the domain.

The calculation of the global parameterization in two dimensions (U, V) is implemented so as to be able to parameterize the entire reference horizon with a single reference frame (U, V). However, contrary to the representation from FIG. 4a, which shows a parameterization example for a surface formed of quadrilaterals, in which the reference frame (U, V) is fixed on the whole horizon, the global parameterization implemented in step 300 defines a reference frame (U, V) for which the direction of the axes U and V is variable over the reference horizon.

Figure 4A:
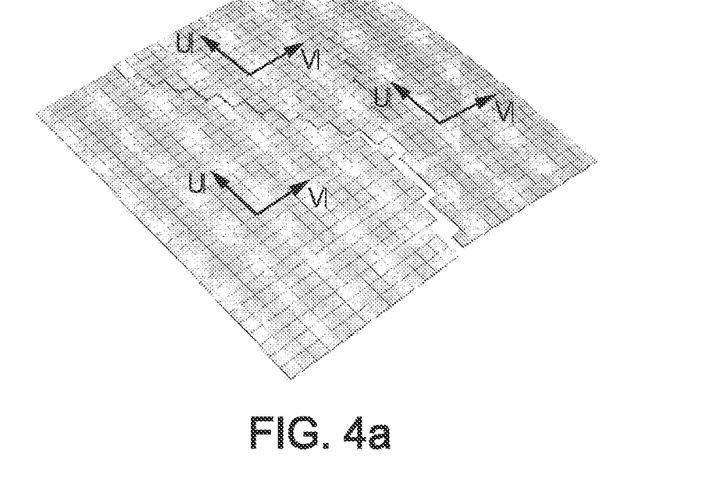
FIG. 4a shows an example of parameterization of a surface with a two-dimensional reference frame fixed over all the surface.
Figure 4B:
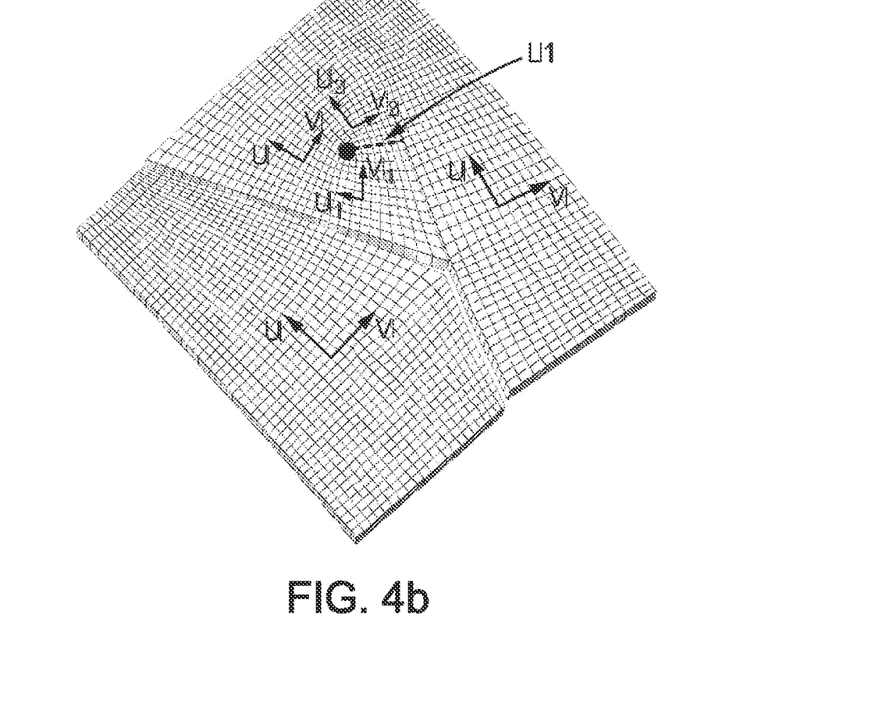
FIG. 4b shows an example of global parameterization of a surface with a two-dimensional reference frame, variable over the surface.

As shown on FIG. 4b, which shows a global parameterization example obtained with a variable reference frame (U, V) on the same surface as FIG. 4a, the global parameterization is determined such that, from one mesh cell to an adjacent mesh cell, the frames are within one rotation (for example a multiple of 90°). Meaning that the coordinates U and V of the reference frame may be interchanged (U becomes V and vice versa) and/or the directions of the U and V axes of the reference frame may be inverted (for example: U becomes −U). This confers additional degrees of freedom in the parameterization of the reference horizon, which makes it possible to comply with angles which are not right angles, and in particular to comply with the geometry of faults or of intersection of faults with boundaries of the domain which are not at a right angle.

The resulting global parameterization $\Phi$ in U and V is shown on the reference horizon $W_{ref}$ by:

A pair of real-valued coordinates (U, V) associated with each vertex of each triangle of $W_{ref}$. Within each triangle, coordinates of any point of the triangle may be obtained by linear interpolation from the coordinates of the three vertexes of the triangle.

A transition function defined for each boundary between two neighboring triangles and establishing the relation between the parametric coordinates (Uj, Vj) of the edge of a triangle and those (Uk, Vk) of the same edge of the neighboring triangle: (Uj, Vj)=$R^a$(Uk, Vk)+(b,c), where $R^a$=is the rotation of the reference frame by a multiple of 90°, (b,c) is the translation of the coordinates, and a, b, c are all integer values. This transition function is only defined if it does not involve the identity function (i.e. a=0, b=0, c=0). As a nonlimiting example, such a function may be defined, between a triangle with index 1 and a triangle with index 2 by: {U2=V1, V2=−U1}, i.e. a=1, b=0, c=0

The calculation of the global parameterization in two dimensions (U, V) of the reference horizon, with a variable reference frame (U, V) on the reference horizon, may be implemented by application:

of the method described in the publication by Ray et al.: "Periodic Global Parameterization," ACM Transactions on Graphics, Association for Computing Machinery, 2006, or of the method described in the publication by D. Bommes et al. "Mixed-Integer Quadrangulation," ACM SIGGRAPH 2009, by using the boundary $\delta W_{ref}$ as a constraint such that the edges of 8W ref must coincide with the integer constant value lines for the coordinates U and V.

Figure 3C:
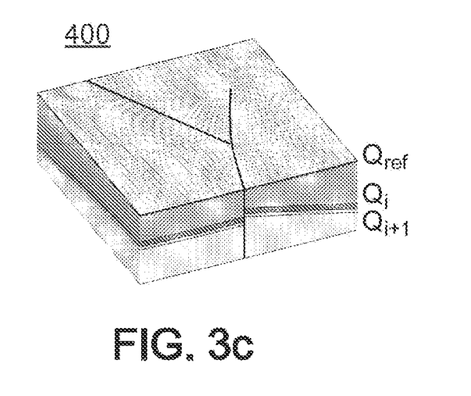
FIG. 3c schematically shows the representation of a horizon from the geological model by a quadrilateral grid.

Once the global parameterization in U and V is obtained for the reference horizon shown by a mesh of triangles, this parameterization is used in order to mesh 400 the same reference horizon with quadrilaterals $Q_i$, meaning for determining a two-dimensional grid, formed of quadrilaterals and representing the reference horizon. An example of implementation of this step is shown in FIG. 3c.

Figure 3D:
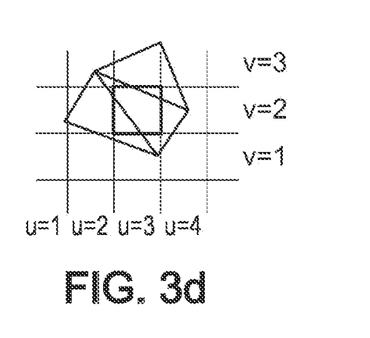
FIG. 3d shows getting a quadrilateral grid representing a horizon from a global parameterization in U and V.

Referring to FIG. 3d, such a grid may be formed by a set of lines with constant values of U and V, for example, lines corresponding to integer constant values of U and V. Given that, during the implementation of the global parameterization in the preceding step, the boundary $\delta W_{ref}$ of the reference horizon was treated as a constraint needing to coincide with lines of integer constant values of coordinates U and V, the edges of the quadrilaterals of the grid obtained by the lines of integer constant values of U and V necessarily correspond to the boundary $\delta W_{ref}$ of the horizon.

Thus, during step 400, a vertex of the grid is created at each intersection between its two lines of constant values of U and V. Edges are created for connecting two vertexes if they have the same coordinate on one axis and a coordinate difference equal to one, in absolute value, on the other axis. The quadrilaterals are then inventoried by the vertexes and the edges thus defined so as to form a parameterized grid in U and V. The size of the quadrilaterals may be determined by a user as a function of the density of the constant-value lines. For example, quadrilaterals may be defined by two consecutive lines in U or V, or as a variant a user may set a larger step, which will also be an integer, if the constant-value lines are integer values.

Once the grid is obtained, it may be used in order to construct a hexahedral mesh in three dimensions over all of the geometric model. In advance, a parameterization 500 will have to be calculated along a third axis W perpendicular to U and V. This parameterization is preferably calculated from the tetrahedral mesh obtained at the outcome of step 100, by associating a coordinate in W with all the vertexes of this mesh, and by using the horizons as geometric constraints. In this way, the surfaces with constant W value correspond naturally to the geometry of the horizons in the initial space. As a variant, this parameterization in W may also be calculated on the deformed geometry $\Omega(T)$.

To do this, the horizons are first sorted by stratigraphic order, meaning in the order in which the geological horizons were formed, and each horizon is assigned a real value that is a function of the stratigraphic depth thereof, where all the vertexes of the mesh cells belonging to the same horizon are assigned the same value. The value of each horizon h may for example correspond to the cumulative thickness of the stacked geological layers at that horizon.

The parameterization is then obtained by interpolation from the values of the vertexes of the mesh cells belonging to the various horizons by solving a system of linear equations, preferably numerically. Intermediate surfaces of constant W values may be defined between the horizons depending on the user's preferences. In FIG. 3c, the example provided comprises only five constant W value surfaces which correspond to the five horizons of the model.

In some embodiments, step 500 may be implemented immediately after step 100, and the steps aiming to prepare a quadrilateral grid representing a reference horizon may be implemented after this step.

The method then comprises a step 600 of getting a hexahedral mesh from the tetrahedral mesh, by combining the quadrilateral mesh $Q_{i,ref}$ from the grid representing the reference horizon $W_{ref}$, and the parameterization in W of the tetrahedral mesh. The hexahedral mesh is obtained by propagating the calculated two-dimensional grid on a reference horizon, over all the other surfaces of constant W value, and in particular over all the other horizons, in a verticalized tetrahedral mesh $\Omega(T)$. Since this mesh was verticalized, all the faults and domain boundaries are vertical, and it is therefore possible to determine, for each constant W value surface other than the reference horizon, a two-dimensional grid formed by the quadrilaterals $Q_{i,j}$ representing said surface, by calculating a projection of the calculated grid for the reference horizon $W_{ref}$ onto each of the constant W value surfaces. In that way, for each of these surfaces, a grid formed of quadrilaterals is obtained and each grid has the same topology as the grid representing the reference horizon.

Figure 3E:
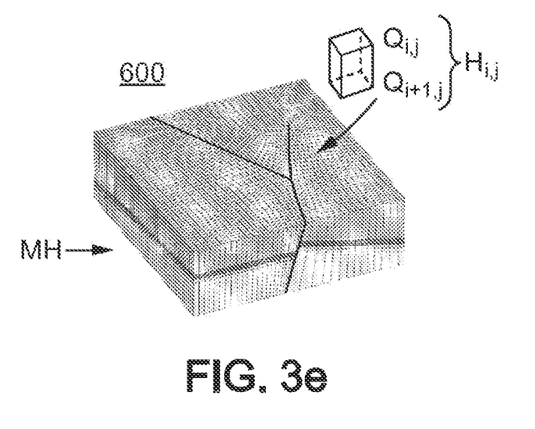
FIG. 3e shows a hexahedral mesh obtained by propagation of the grid shown in FIG. 3c.

Referring to FIG. 3e, a hexahedral grid may next be obtained by constructing a set of hexahedra $H_i$ between two consecutive constant W value surfaces, such that the two opposite surfaces of a hexahedron are respectively formed by a quadrilateral $Q_i$, $Q_{i+1}$ from each constant-value surface. This hexahedral mesh is obtained from the verticalized tetrahedral mesh, which represents a deformed geometric model wherein all the faults and boundaries of the domain are verticalized. Consequently a hexahedral mesh for the initial geometric model is obtained by applying 700 to the resulting hexahedral mesh the inverse deformation $\Omega^{-1}$ from the deformation which made it possible to verticalize the tetrahedral mesh in step 200. An example of a hexahedral mesh resulting from this step is shown in FIG. 3e.

Figure 3F:
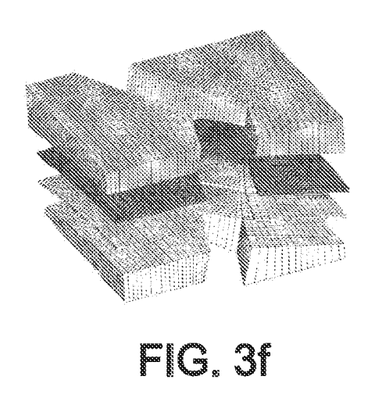
FIG. 3f is an exploded view of the mesh shown in FIG. 3e.

At the outcome of this step, a hexahedral mesh MH results which, because of the steps with which it was obtained, contains few if any singular points, as a function of the initial complexity of the geometric model, and in particular of the number and arrangement of the faults. In fact, because of using a global parameterization in U and V to mesh a reference surface which is then projected on the other surfaces in a verticalized version of the domain, it is possible to assure that all horizons and all the surfaces of constant W value have the same number of singular points. Further, the method of implementation for getting the global parameterization in U and V of the reference surface itself serves to minimize the number of singular points in the mesh of this surface. As can be seen in FIG. 3f, which represents an exploded view of the mesh from FIG. 3e, the method also serves to mesh the boundaries of the domain and also the edges of the faults in hexahedral mesh cells.

Nonetheless, in the case where the resulting hexahedral mesh MH nevertheless comprises singular points, meaning points where the mesh is locally unstructured, the method further comprises an additional processing of the mesh 800, in order to make the hexahedral mesh structured at each of these points (and cells).

Referring to FIG. 5a, this additional processing 800 to the mesh MH comprises the partitioning 810 of hexahedral mesh MH into several submeshes each of which may be indexed locally by a respective triplet ($U_i$, $V_i$, $W_i$). In the following, the term "indexed" or "indexing" designates a parameterization where each vertex and cell of the mesh has integer coordinates. Such an indexing may be deduced from the mesh for their horizons in step 400 which is obtained from the U and V integer constant value lines.

After construction of the hexahedral mesh MH previously described, since all the constant W value surfaces have the same mesh in two dimensions (because it is obtained by projection of a grid from a reference horizon onto all the other constant W value surfaces), this partitioning into three dimensions may be obtained by partitioning a two-dimensional grid representing a horizon or any other constant W value surface.

In order to implement the two-dimensional partitioning, all the singular points of the surface being considered are first identified, meaning, in two dimensions, all the points which are connected to a number of cells different from 4 (except the edges). For each singular point, a set of cut lines is defined starting from the singular point and extending along the edge of a quadrilateral for which the singular point is a vertex, where each cut line stops at the intersection with another cut line, or with a fault or even with an edge of the domain. A cut line LI is shown on FIG. 4b and other cut lines are shown dotted on FIGS. 5a and 5b. These cut lines partition the surface being considered into a set of structured grids formed of quadrilaterals, where each grid may easily be indexed by a pair of local coordinates [U, V].

These cut lines, if they are propagated along the W axis, form cut planes partitioning the hexahedral mesh into structured submeshes SMi which may all be indexed by respective local coordinates [$U_i$, $V_i$, $W_i$].

Once the partitioning is done, referring to FIG. 4b, all the resulting submeshes SMi are integrated 820 into a hexahedral mesh MU for global indexing, comprising a number of mesh cells greater than the total cumulative number of mesh cells of all the submeshes. The integration of submeshes into this mesh MU is done so as to preserve as much as possible the neighboring mesh cell pairs in the initial hexahedral mesh MH. For the neighboring mesh cell pairs in the initial hexahedral mesh and which are no longer in the global mesh obtained at the outcome of this step, these pairs are nevertheless identified during a step 830 in order to be able to be indicated explicitly to a flow simulator, and they are considered as neighboring mesh cells.

In a specific embodiment, integration of hexahedral submeshes into a global indexing mesh is implemented in a simplified way in two dimensions by integrating each subgrid obtained in the preceding step into a two-dimensional global indexing grid. This integration is then propagated in three dimensions to other surfaces of constant W value in order to get the global structured hexahedral mesh.

Integration of the two-dimensional grids into a global indexing grid may be executed as follows:

For each of the subgrids, a two-dimensional frame is determined encompassing all of the indexes occupied by a cell of the subgrid in its local indexing, and the dimensions of this frame are determined in order to get the dimensions of the frame along U and V: [$U_{max\_i}$, $V_{max\_i}$]. where $U_{max\_i}$ and $V_{max\_i}$ therefore correspond to the size of the frame.

A two-dimensional global indexing grid is then initialized during this step. It involves a grid having an indexing in U and V which will be shared with all of the subgrids at the outcome of the integration step. During its initialization, this grid has dimensions in U and V corresponding respectively to the sum of the dimensions in U and to the sum of the dimensions in V of the frames determined for all of the subgrids. By writing $Nu_{init}$ and $NV_{init}$ for the initial dimensions of this global space, $NU_{init}$ is defined by $\Sigma_i U_{max\_i}$, and $NV_{init}$ is defined by $\Sigma_i V_{max\_i}$.

The global indexing grid is then filled by the subgrids, in order of decreasing subgrid size, where the size of each subgrid is determined by the size $U_{max}$, $V_{max}$ of the frame encompassing each subgrid.

For each subgrid, the subgrid is inserted in the global indexing grid by determining a translation associating a corresponding index in the global indexing grid with each occupied index of the subgrid, so as to respect the following two conditions:

Each subgrid inserted in the global parameterization grid must only occupy unoccupied indexes of this grid;

Each subgrid must be inserted so as to be the closest possible to the other subgrids, so as to minimize the number of unoccupied indexes of the global indexing grid.

Once all the subgrids have been inserted, the global indexing grid is resized so as to correspond to a minimal two-dimensional frame encompassing all the subgrids. The size of this frame is in most cases very much smaller than the initial size of the indexed space of $NU_{init} \times NV_{init}$.

Figure 5B:
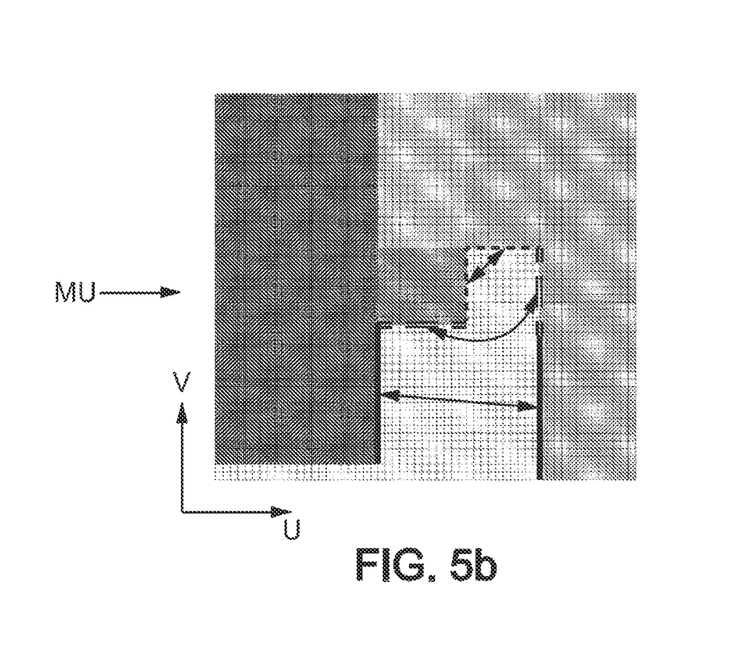

An example of the resulting mesh is shown in FIG. 5b. After getting this remeshing in two dimensions, it may be easily propagated along the W coordinate in order to get a completely structured hexahedral mesh.

As indicated above, and as can be seen in FIG. 5b, some geometrically neighboring mesh cells are indexed with nonconsecutive indexes in the new mesh. For example, two mesh cells positioned respectively at (U, V) and (U+1, V) in the initial unstructured mesh may have indexes (U,V) and (U+10, V−30) in the new mesh. All initially neighboring mesh-cell pairs (at least one of the indexes U and V is consecutive between the two mesh cells in the initial mesh) along a fault or cut plane (or a cut line, in two dimensions) and which are no longer indexed with consecutive indexes at the outcome of step 5b are identified during a step 830. On FIG. 5b, we have thus referenced the initially neighboring mesh-cell pairs with arrows and identical appearance lines.

At the outcome of this processing, a structured hexahedral mesh is therefore obtained representing the initial geometric model. This mesh is therefore compatible with all currently used flow simulators.

Figure 6A:
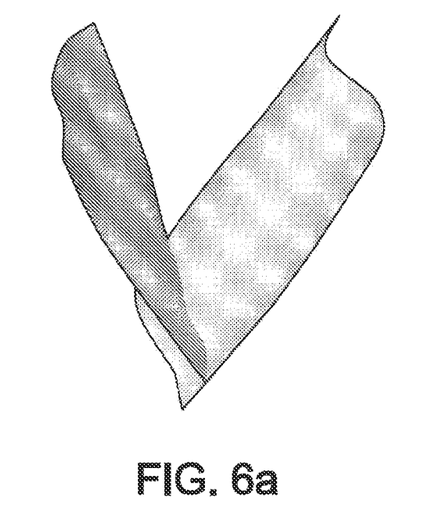
FIG. 6a shows a sample fault in X or Y.

In the case described with reference to FIG. 6a where the initial geometric model comprised faults in X or in Y or wells or substantially horizontal well segments formed by the intersection of vertical surfaces of this type, for which some faults were temporarily eliminated in the preliminary step 90, the method further comprises the supplemental steps 900 allowing reintroduction of the faults eliminated from this mesh.

First, the cells of the structured hexahedral mesh obtained at the outcome of implementing the method described above which are located at the intersection with the initial placement of the eliminated fault or each deleted fault, are deleted 910 so as to form one or more cavities in the mesh.

Figure 6B:
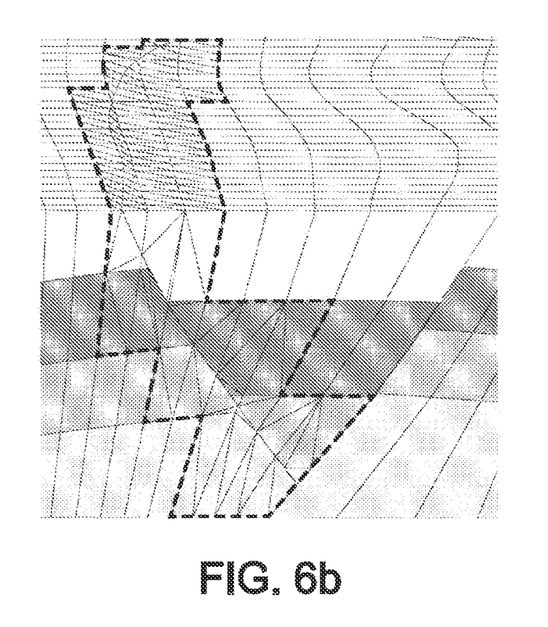
FIG. 6b shows an integration of the resulting subgrids on FIG. 4a in a grid with a global indexing space.

Next, each eliminated fault is reintroduced in the hexahedral mesh, and the remaining voids in the mesh, at the intersection with each reintroduced fault, are filled 920 by polyhedral cells, which may for example be tetrahedral or hexahedral cells or pyramids or prisms or arbitrary polyhedra or a mixture of various elements. This filling may for example be implemented by constrained Delaunay tessellation, by using the reintroduced faults and the edges of each cavity as geometric constraints. FIG. 6b shows a sample mesh obtained in the neighborhood of a fault which was eliminated and then reintroduced according to this embodiment.

Therefore, even for geometrically complex models integrating faults in Y or X, or for representing complex wells, a mesh is obtained which is mostly structured hexahedral, with only a few local zones of unstructured mesh around some complex faults or wells.

Implementation of the method described above therefore allows getting a digital representation of a reservoir or of a geological basin. The resulting numeric representation allows implementation of the modeling of the petrophysical properties such as the permeability and porosity via geostatistical methods. Fluid flow simulations may then be performed on this digital representation filled with petrophysical properties in fluid flow simulation software, for example, in the case of hydrocarbon extraction, for determining the positioning of injection and production wells and also determining an optimal injection pressure for a fluid in the wells in order to get a better production yield. In the case of geological storage of CO2 or H2 and also the extraction of geothermal energy, a geo-mechanical simulation may be done for the purpose of determining the deformation of the reservoir as a consequence the change of pressure, permeability, porosity and other properties arising during production/operation, and therefore predicting a risk of subsidence, reactivation of faults of the reservoir and thus an induced seismicity.

The invention claimed is:

1. A method implemented by a calculator, and comprising:
generating a three-dimensional tetrahedral mesh based on a geological model delimited by a set of boundaries and comprising a set of horizons and a set of faults, where the tetrahedral mesh satisfies a set of surface constraints corresponding to the faults, horizons and boundaries of the geological model;
getting a three-dimensional hexahedral mesh based on a tetrahedral mesh, comprising:
applying a first deformation to the tetrahedral mesh to make the faults and boundaries vertical;
calculating a global parameterization in two dimensions U, V for a reference horizon of the deformed tetrahedral mesh;
determining a two-dimensional grid formed from quadrilaterals representing the reference horizon based on the global parameterization along two axes U, V of said reference horizon;
obtaining a three-dimensional hexahedral mesh by propagation of the grid representing the reference horizon to the other horizons of the geological model; and
applying a deformation that is an inverse to the first deformation to the resulting hexahedral mesh in order to restore the initial geometry of the faults; and
if the resulting hexahedral mesh comprises at least one singular point, implementing an additional processing of the mesh in order to structure the mesh near each singular point.

2. The method according to claim 1, wherein the propagation of the grid to three dimensions comprises:
calculating a parameterization along a third axis W, perpendicular to the axes U and V, of the three-dimensional tetrahedral mesh such that each horizon corresponds to a constant-value surface along the coordinate w;
determining a two-dimensional grid based on quadrilaterals representing each constant surface along the coordinate W starting from the grid representing the reference horizon; and
constructing a set of consecutive hexahedra between two constant surfaces along the W coordinate, such that two opposite surfaces of the hexahedron are formed respectively by a quadrilateral of each constant surface, where said set of hexahedra form the hexahedral mesh.

3. The method according to claim 1, wherein the calculation of the global parameterization in U, V of the reference horizon is implemented such that the edges of the reference horizon coincide with integer constant-value lines of U and V, and the determination of the two-dimensional grid formed of quadrilaterals representing the reference horizon is implemented by forming a set of quadrilaterals whose vertexes are defined by points of intersection of the integer constant-value lines of U and V.

4. The method according to claim 1, wherein the calculation of the global parameterization along two axes of the reference horizon is implemented such that each cell of the reference horizon is parameterized relative to two axes U and V, where the directions of the axes U and V of the reference frame are variable along the reference horizon.

5. The method according to claim 4, wherein the global parameterization U, V of the reference horizon associates to each shared edge between two neighboring triangles a transition function establishing a relation between the coordinates (Uj, Vj) of an edge of a first triangle of the neighboring triangles, and the coordinates (Uk, Vk) of an edge of the other neighboring triangle, such that: (Uj, Vj)=$R^a$(Uk, Vk)+ (b,c), where $R^a$ is the rotation of the reference frame by a multiple of 90°, (b,c) is the translation of the coordinates, and a, b, c are all integer values.

6. The method according to claim 1, wherein the additional processing of the mesh for making the structured mesh comprises:
partitioning the hexahedral mesh obtained into a plurality of structured hexahedral submeshes each associated with a respective local indexing (U, V, W);
integrating each structured hexahedral submesh into a structured hexahedral mesh associated with a global indexing (U, V, W); and
identifying all neighboring mesh-cell pairs in the hexahedral mesh initially obtained and which are no longer in the structured hexahedral mesh with global indexing.

7. The method according to claim 6, wherein the integration of each structured hexahedral submesh into a structured hexahedral mesh associated with a global indexing (U, V, W) comprises:
partitioning of a two-dimensional grid representing a horizon of the set into a plurality of subgrids;
integrating all of the subgrids into a two-dimensional grid associated with a global indexing (U, V), where said integration comprises:

for each subgrid, determining a frame in two dimensions, U and V, encompassing all of the occupied indexes of the subgrid in its local indexing, and determining $U_{max\_i}$ and $V_{max\_i}$ dimensions of this frame;

initializing a two-dimensional grid associated with a global indexing (U, V); the dimensions in U and V are respectively the sum of the dimensions in U and the sum of the dimensions in V of the frames determined for all the subgrids;

filling in the global indexing grid by each subgrid in order of decreasing size of each subgrid, such that each subgrid inserted in the global indexing grid occupies only unoccupied indexes of the global indexing grid, and that it is the closest possible to the previously inserted subgrids;

resizing the global indexing grid in order to correspond to a minimum frame encompassing all the subgrids; and propagating the resulting global indexing grid along the W axis in order to get a structured hexahedral mesh integrating all the submeshes including the initial hexahedral mesh.

8. The method according to claim 1, wherein the geological model further comprises at least one well, wherein the well is represented by a line of intersection between two surfaces treated as virtual faults.

9. The method according to claim 1, further comprising implementation, on the resulting mesh, of an additional processing selected from the following group:
   modeling of physical properties by geostatistical methods;
   fluid flow simulation;
   geomechanical simulation;
   heat simulation;
   chemical simulation;
   coupled multi-physical simulation; and
   kinematic simulation.

10. A method for generating a mostly hexahedral mesh from a geological model comprising at least two crosscutting faults having an intersection extending along a substantially horizontal line, and the method comprises:
   implementing the method according to claim 1 based on a modified geological model wherein a fault was eliminated from a set of crosscutting faults so as to eliminate the substantially horizontal intersection, in order to get a hexahedral mesh;
   eliminating a set of hexahedral mesh cells located at the intersection with the placement of the eliminated fault;
   integrating the eliminated fault in the hexahedral mesh and filling in the eliminated cells with polyhedral cells.

11. A non-transitory computer-readable storage having stored thereon code instructions which, when executed by a computer, cause said computer to implement the method according to claim 1.

12. A device for generating a hexahedral mesh based on a geological model, wherein the device comprises a computer configured for implementation of the method according to claim 1.

* * * * *